June 6, 1967     F. G. CHESLEY ETAL     3,323,744

FILM STRIP CANISTER

Filed March 11, 1966

INVENTORS
FRANK G. CHESLEY
BY LOGAN W. JOHNSON

Braddock + Burd
ATTORNEYS

United States Patent Office 3,323,744
Patented June 6, 1967

3,323,744
FILM STRIP CANISTER
Frank G. Chesley, Red Wing, and Logan W. Johnson, Golden Valley, Minn., assignors to Central Research Laboratories, Inc., Red Wing, Minn., a corporation of Minnesota
Filed Mar. 11, 1966, Ser. No. 533,717
8 Claims. (Cl. 242—71.1)

This invention relates to a canister for storing and dispensing developed film strip for projection.

It is common practice to illustrate classroom and other lectures by means of still pictures projected from a film strip made up from a series of related but different pictures arranged in sequence on a single film strip. Film projectors for projecting single frames from such film strips are commercially available and in widespread use. The film strip is advanced through the projector one frame at a time, either manually or mechanically, with a pause for description or explanation of the projected picture. One exemplary form of film projector with mechanical film advancing means is described in Dunning Patent No. 3,096,683 issued July 9, 1963.

Film strips are commonly supplied in the form of a loose coil or roll contained within a metal can having a tightly fitted cover to protect the film from dust and dirt, humidity changes, fading effects of continued exposure to light, and the like. When such a film strip is to be projected, it is removed from the can and attached to whatever film supporting means are provided on the projector being used. The free end of the film strip is threaded through the projector and, as the film strip is advanced through the projector, that end becomes the inner end of a reversely wound roll of film strip. After the showing is finished the reverse roll must then be removed from the projector and rewound and reinserted into its storage can. This common practice involves multiple handling of the film with attendant dangers of scratching or tearing the film, smearing with fingerprints, attracting dirt and dust, and the like.

It is the object of this invention to provide a self-storing film strip canister from which film strip may be unwound for projection and rewound for further storage without the necessity of any handling of the film by the projector operator except for threading the film strip into the projector.

The invention is illustrated in the accompanying drawings in which the same numerals identify corresponding parts and in which.

Figure 2:
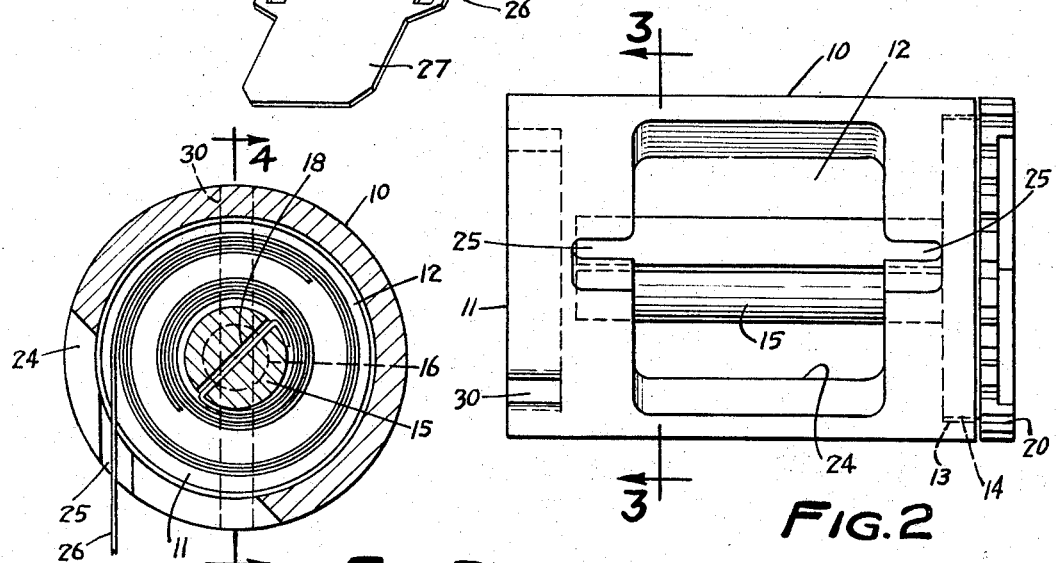
FIGURE 2 is a side elevation of the canister shown empty.
Figure 3:
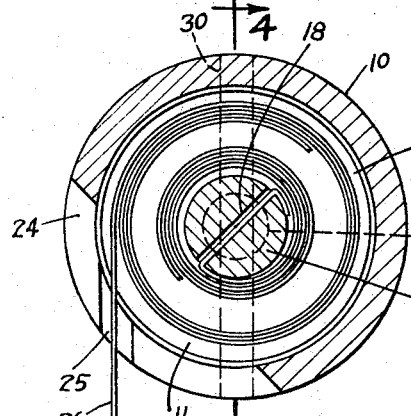
Figure 4:
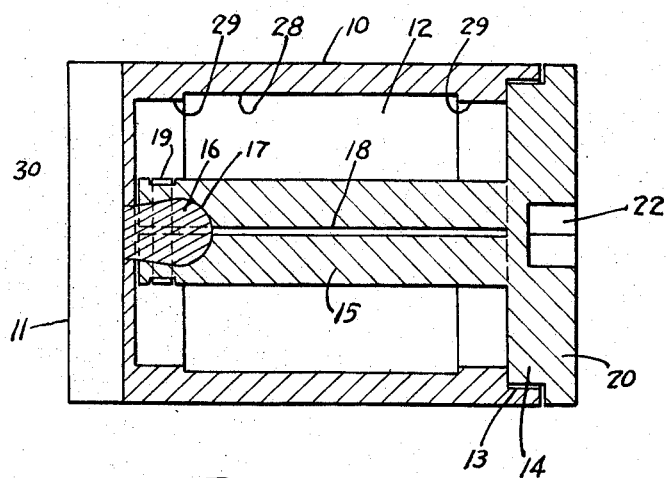

FIGURE 3 is a transverse section on the line 3—3 of FIGURE 2 and in the direction of the arrows, the section being shown with film in the canister and the canister rotated about 45° counterclockwise to align the film for projection; and FIGURE 4 is a longitudinal section on the line 4—4 of FIGURE 3 and in the direction of the arrows, with the canister empty.

Referring now to the drawings, the film strip canister includes a hollow cylindrical body or housing 10 which is closed at one end by end wall 11 and is open at the other end. The housing encloses a cylindrical film storage chamber 12. The open end of housing 10 is provided with an annular recess 13 into which is fit a flat circular disc 14 which serves as a closure for the open end of the housing. Disc 14 supports one end of a film winding spool 15 which extends the full length of chamber 12 and is journalled for rotation about the longitudinal axis of the housing.

A bulbous end bearing 16 is disposed centrally on the inside of end wall 11 and projects into chamber 12. One end of spool 15 is provided with a socket 17 adapted to engage the projecting end bearing 16. Spool 15 is provided with a longitudinal slot 18 for its entire length. Slot 18 is for the primary purpose of securing one end of the film strip to the spool 15. It also imparts resilience to the end of the spool containing socket 17. This enables the end of the spool to expand to fit over the enlarged bulbous end of end bearing 16 and snap into place to retain spool 15 and disc 14 in place in the housing. Preferably a spring clip 19 or similar fastening means is provided at that end of spool 15 in order to prevent accidental disengagement of the spool from the end bearing.

A circular disc handle or knob 20 is secured to disc 14, and is desirably formed integrally therewith. Knob 20 is of slightly larger diameter so as to extend at least to the outer periphery of the housing for easy grasping by the fingers to rotate the spool 15. The edges of knob 20 are desirably knurled for easier grasping by the fingers. The exposed face of knob 20 is desirably provided with an off-center recess 21 into which a fingertip or end of a pencil or the like may be inserted to function as a crank for rotating the film spool. Knob 20 is also desirably provided with a non-circular centerline recess 22 into which the end of a mechanical crank may be inserted to wind the film spool. End recess 23 functions as a guide for such a crank.

The side wall of cylindrical housing 10 is provided with an aperture 24 of a size to permit insertion of the fingers into the housing in order to permit the fingers to grasp the free end of the wound film so that it may be withdrawn from the canister. Chamber 12 is desirably of a length to just receive a wound roll of film strip without causing the film to bind. Aperture 24 is centrally spaced with respect to the ends of chamber 12 and is of lesser length. Desirably the length of aperture 24 is about the width of the developed portion of the film strip so that the perforated strips on opposite sides of the developed area are retained by the portions of the housing wall adjacent opposite ends of aperture 24. Typically the aperture should occupy about 75° to 90° of the cylindrical periphery of the housing.

At the opposite ends of aperture 24 intermediate between the side edges thereof are a pair of aligned film guiding slots 25. As best seen in FIGURE 3, slots 25 are formed in the wall of housing 10 at an oblique angle so as to form passages which are generally tangential with the inside wall of the housing. This is to guide the film 26 in a generally tangential path as it is being unwound from or wound onto spool 15. Each slot 25 is substantially thicker than the thickness of the film for easy passage of the film. The slots 25 engage the perforated opposite edges of the film strip.

Figure 1:
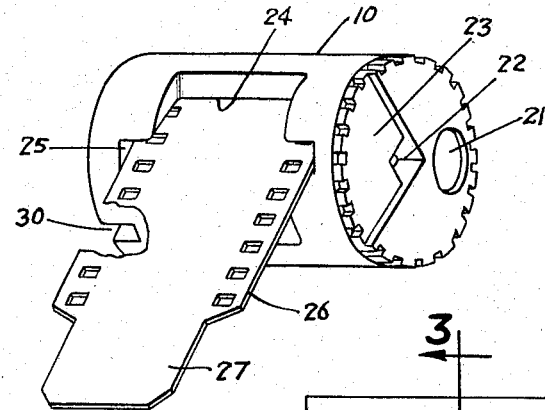
FIGURE 1 is a perspective view of the film strip canister shown with the free end of a film strip emerging from the canister.

As best seen in FIGURE 1, the free end of the film 26 is desirably provided with a tongue 27 which is of about the width equalling the length of aperture 24. Then, when it is desired to grasp the free end of the film strip to thread it into a projector, the knob 20 is rotated to rotate the roll of film until the free end is exposed through aperture 24. The inherent resiliency of the coiled film strip will cause the end of film tongue 27 to flip into aperture 24 where it can be readily grasped between finger and thumb. Then, a gentle pull on tongue 27 guides the perforated side margins of the film strip through the guiding slots 25.

As best seen in FIGURE 4, in order to prevent damage to the film strip due to abrasion of the film by the inside wall of the housing, the center portion 28 of the inner housing wall is recessed slightly with respect to the end portions 29. Recessed portion 28 is substantially the width of the developed portion of the film strip and raised portions 29 are substantially the width of the perforated margins. Thus, as the spool 15 is rotated and the film is moved relative to the inside housing wall, only the perforated margin portions of the film come into contact with the wall, the center developed portion of the film being spaced from the recessed area 28.

In most film strip projectors the film is moved in a vertical plane through the projector. In order to properly align the guiding slots 25 for proper feeding of the film strip into the projector and in order to hold the housing 10 stationary to permit rotation of spool 15 and withdrawal of the film strip, a recessed slot 30 is provided in the outside end wall 11 of the housing. When the canister is in use the slot 30 is engaged by a supporting member of the film strip projector to hold the cartridge stationary and aligned for proper feeding of the film strip.

For protection during storage the film strip canister may be inserted into a storage can of the type now commonly in use, or into a film strip storage case for storage of multiple film strips as also in common use. Alternatively, the canister may be fitted with a tight slide fit into a protective sleeve or open ended can.

We claim:

1. A storage and dispensing canister for strip film for projection comprising:
   (A) a hollow cylindrical housing to receive a coiled roll of developed film strip,
   (B) rotatable spool means extending longitudinally of said housing and journalled for rotation generally about the longitudinal axis thereof,
   (C) manual means external of said housing adjacent one end connected to said spool means for rotation thereof,
   (D) means for securing one end of a film strip to said spool means,
   (E) an aperture in the side wall of said housing to permit insertion of a finger into the housing for grasping the free end of a coiled roll of film strip,
   (F) said aperture being of a width less than the width of said film, and
   (G) a pair of film guiding slots on opposite sides of said aperture and in communication therewith for engaging the edges and guiding film into and out of said housing,
   (H) said slots being aligned longitudinally of said housing and angularly disposed so as to be generally tangential to the inside wall of the housing.

2. A canister according to claim 1 further characterized in that said spool means is provided with a longitudinal film receiving slot for securing said film to said spool means.

3. A canister according to claim 1 further characterized in that
   (A) said housing is closed at one end and open at the other,
   (B) the inside surface of said closed end is provided with a central projecting end bearing,
   (C) one end of said spool means is provided with a socket for engaging said bearing,
   (D) the other end of said spool means extends through the open end of said housing and is provided with a knob for rotating said spool means.

4. A canister according to claim 3 further characterized in that
   (A) said knob is a generally flat circular disc of diameter at least equal to the diameter of the housing,
   (B) said disc is knurled on its edges and
   (C) the exposed face of said disc is provided with crank engaging apertures to facilitate rotation of said pool means.

5. A canister according to claim 3 further characterized in that said end bearing is bulbous and the socket in one end of said spool means is bulbous and resiliently engages said end bearing to retain said spool means in said housing.

6. A canister according to claim 1 further characterized in that said housing is provided at one end with means for securing said housing against rotation during projection of the film strip contained therein and aligning said film guiding slots for directing said film for projection.

7. A canister according to claim 6 further characterized in that said securing and aligning means comprises a slot recessed into and extending diametrically across the outside end wall of the housing opposite from the means for rotation of the spool means.

8. A storage and dispensing canister for strip film for projection comprising:
   (A) a hollow cylindrical housing to receive a coiled roll of developed film strip,
   (B) said housing being closed at one end and open at the other,
   (C) a central projecting bulbous end bearing on the inside surface of the closed end of the housing,
   (D) rotatable spool means extending longitudinally of said body,
   (E) a bulbous socket in one end of said spool means for resiliently engaging said end bearing to journal said spool means for rotation generally about the longitudinal axis of said housing and to retain said spool means in the housing,
   (F) said spool means having a longitudinal film receiving slot for securing one end of the film strip to said spool means,
   (G) the other end of said spool means extending through the open end of said housing,
   (H) a knob on said other end of said spool means for rotating said spool means,
   (I) said knob being a generally flat circular disc of diameter at least equal to the diameter of the housing knurled on its edges and provided on its exposed face with crank engaging apertures to facilitate rotation of said spool means,
   (J) an aperture in the side wall of said housing to permit insertion of a finger into the housing for grasping the free end of a coiled roll of film strip,
   (K) said aperture being of a width less than the width of said film,
   (L) a pair of film guiding slots on the opposite sides of said aperture and in communication therewith for engaging the edges and guiding film into and out of said housing,
   (M) said slots being aligned longitudinally of said housing and angularly disposed so as to be generally tangential to the inside wall of the housing, and
   (N) a slot recessed into and extending diametrically across the outside closed end wall of said housing for securing said housing against rotation during projection of the film contained therein and aligning said film guiding slots for directing said film for projection.

References Cited

UNITED STATES PATENTS 2,537,883   1/1951   Ernisse _____ 242—71 X

FRANK J. COHEN, *Primary Examiner.*

N. L. MINTZ, *Assistant Examiner.*